Feb. 28, 1933.  S. H. EARL  1,899,023
GEAR CUTTER
Filed Dec. 24, 1930  2 Sheets-Sheet 1
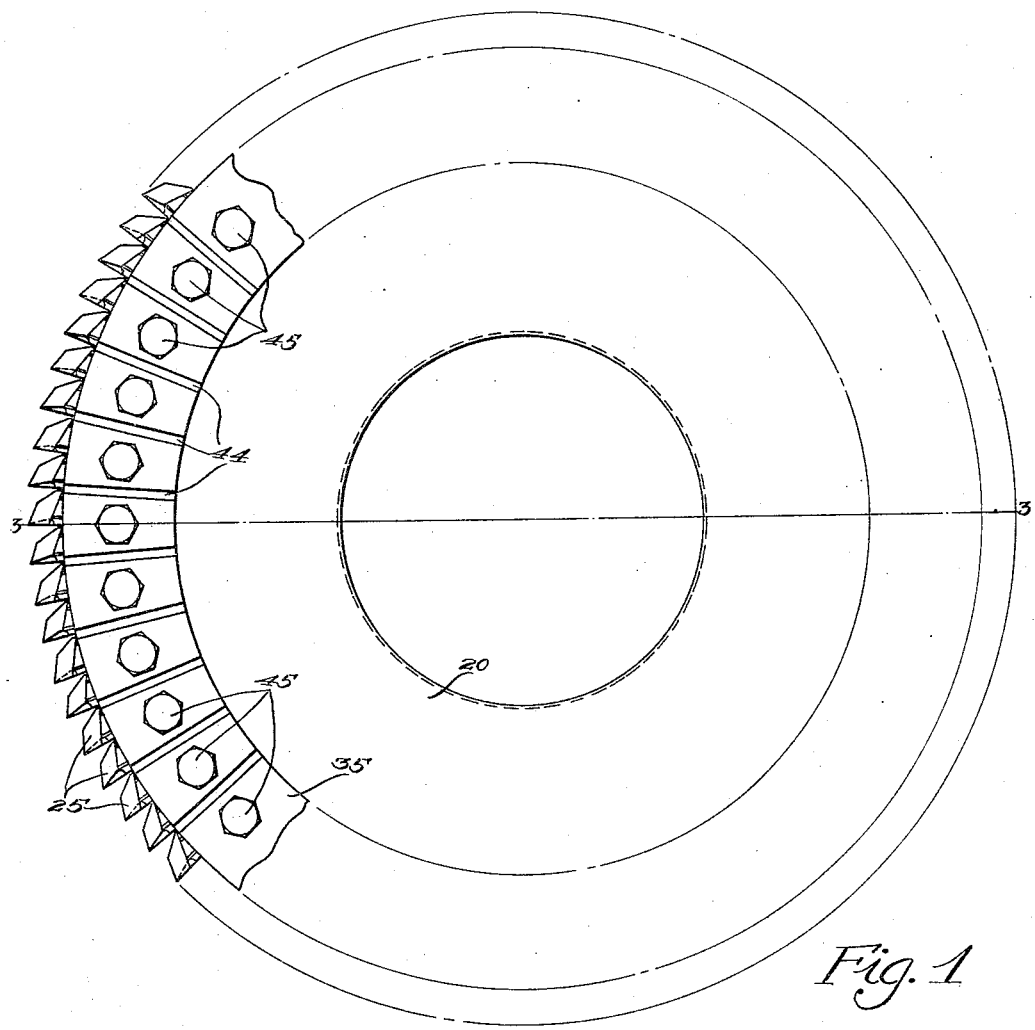
Fig. 1
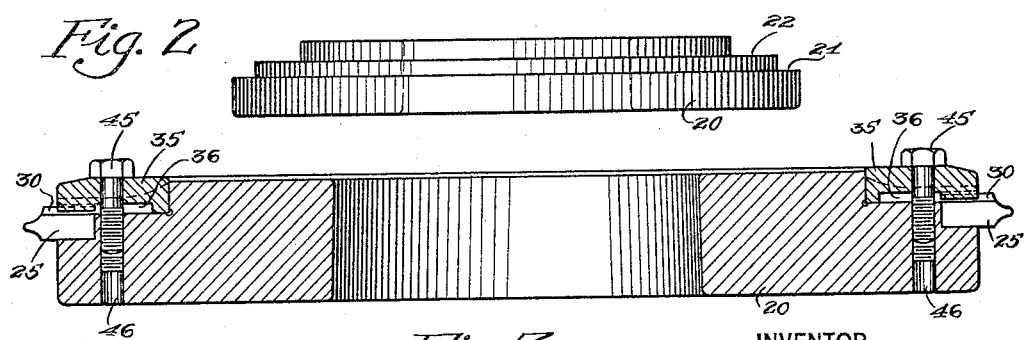
Fig. 2
Fig. 3
INVENTOR
Schuyler H. Earl
BY
ATTORNEY Patented Feb. 28, 1933

1,899,023

UNITED STATES PATENT OFFICE

SCHUYLER H. EARL, OF ROCHESTER, NEW YORK, ASSIGNOR TO GLEASON WORKS, OF ROCHESTER, NEW YORK, A CORPORATION OF NEW YORK

GEAR CUTTER

Application filed December 24, 1930. Serial No. 504,578.

The present invention relates to cutting tools of the inserted blade type and particularly to gear cutters for roughing straight bevel gears.

The primary purpose of this invention is to provide an improved form of roughing cutter for use on bevel gear roughing machines of the type disclosed in Patent No. 1,344,879 issued to James E. Gleason et al. on June 29, 1920. To this end, one object of this invention is to provide a gear cutter in which a greater number of cutting blades can be secured. Thus, a cutter constructed according to this invention can be used a longer time between sharpenings or a faster feed can be employed on the gear cutting machine in the cutting of the gears without decreasing the life of the cutter or the length of time between sharpenings.

A further object of this invention is to provide a simple but improved method of clamping the cutting blades in a cutter head.

Other objects of the invention will be apparent hereinafter from the specification and from the recital of the appended claims.

In the drawings:

Figure 1 is a plan view of a cutter constructed according to one embodiment of this invention. Only a portion of the cutter is shown in full lines, but it will be understood that the blades are arranged in a complete circle;

Figure 2 is an elevational view of the cutter head on a somewhat reduced scale;

Figure 3 is a sectional view of this cutter such as would appear on the line 3—3 of Figure 1;

Figure 4:
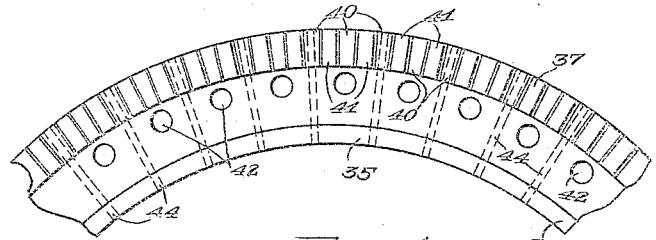
Figure 4 is a fragmentary bottom plan view of the clamping disc or ring.
Figure 5:
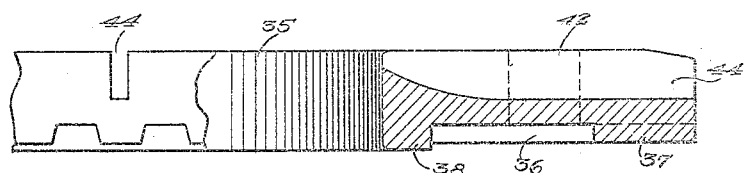
Figure 5 is a fragmentary elevational view of this ring on an enlarged scale and with parts broken away for the purpose of better illustration.
Figure 6:
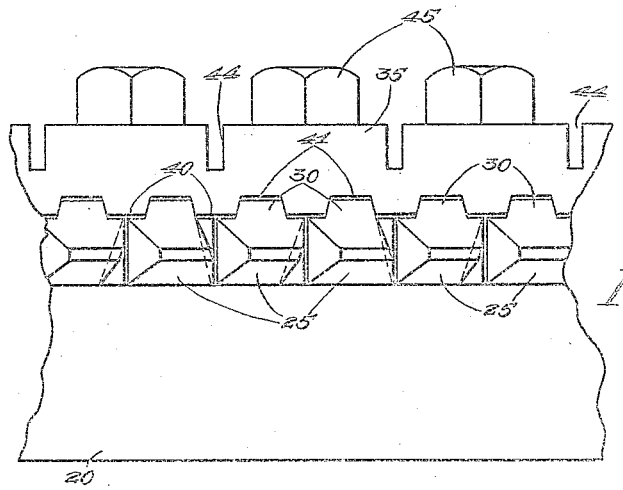
Figure 6 is a fragmentary side elevation of the cutter on an enlarged scale.

In a cutter constructed according to the present invention, the cutting blades are clamped in place in a rotary cutter head by a clamping member, preferably in the form of a ring, which is provided with alternate ribs and grooves that interlock with complementary ribs formed on the cutting blades.

In the drawings, 20 designates the cutter head. This is turned to provide an annular seat at 21 for the cutting blades and an annular seat at 22 for the clamping disc or ring.

Figures 7, 9:
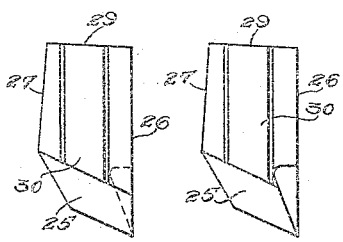
Figures 7 and 8 are a plan view and a side elevation, respectively, of a cutting blade for cutting one side face of a gear tooth.
Figures 9 and 10 are a plan view and a side elevation, respectively, of a cutting blade for cutting the opposite side face of a gear tooth.
Figures 8, 10:
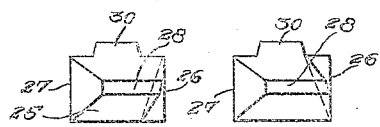

The cutting blades designated at 25 are relieved on their top and side faces to provide the cutting clearance. In the preferred construction of the cutter, alternate blades have oppositely directed cutting edges formed by providing alternate blades with opposite front rake or shear angles. Figures 7 and 8 are views of a blade for cutting one side face of the gear teeth and Figures 9 and 10 are views of a blade for cutting the opposite sides of the gear teeth. It will be noted that these blades have oppositely directed cutting edges and opposite front rake or shear angles.

The front and rear faces 26 and 27 respectively, of each blade converge from the tip surface 28 thereof to the foot 29 of the blade, and each of the blades is formed on one side face with a longitudinal rib designated at 30. These ribs 30 have their sides beveled so that they have the form of a truncated wedge or prism.

The clamping member is indicated at 35. It is in the form of an annulus or ring. The under face of this annulus or ring 35 is formed with an annular groove or recess 36 which leaves a blade-engaging portion 37 and a foot portion 38 that are spaced radially apart. The under face of the blade-engaging portion 37 is formed with alternate ribs 40 and grooves 41. The sides of the ribs 40 and grooves 41 are tapered conforming in taper to the taper of the sides of the ribs 30 formed on the cutting blades. The grooves 41 of the clamping ring are of uniform width throughout their length being exactly complementary to the ribs 30 formed on the cutting blades. The sides of the ribs 40 converge, accordingly, to the center of the ring. The height of the foot portion 38 of the ring is greater than the height of the ribs 40 of the blade-engaging portion 37 for a purpose which will hereinafter appear.

There are bolt holes 42 drilled in the ring between the blade-engaging and foot portions thereof. Radial saw-slots 44 are cut in the upper face of the ring at spaced intervals to make the ring flexible so that a greater clamping effect can be secured when it is tightened up on the cutting blades.

In assembling the cutter, the blades 25 are first placed on the seat or groove 21 of the cutter head 20, being arranged radially of the axis of the cutter head with the rear face 27 of one blade adjoining the front face 26 of the next blade and preferably, also, the blades are arranged so that alternate blades will cut opposite side tooth faces of a gear blank. This latter feature is, of course, optional and any suitable arrangement of the blades may be employed instead. The clamping ring is then placed on the head. The foot portion 38 of this ring rests upon the annular seat 22 of the head while the blade engaging portion 37 of the ring engages the cutting blades 25. Since the blades 25 are arranged radially of the head and since the grooves 41 of the clamping ring are complementary to the ribs 30 of the blades and the ribs 40 of the clamping ring have converging sides corresponding to the radial arrangement of the blades, the engagement of the clamping portion of the ring with the blades is an interlocking engagement. Each rib 40 of the clamping ring engages between the ribs 30 of a pair of adjoining blades 25.

As stated above, the height of the foot portion 38 of the clamping ring is greater than that of the ribs 40 of the blade-engaging portion 37 thereof. As a result, when the ring is seated on the cutter head, the blade engaging portion 37 is slightly spaced from the blades. The blades are clamped in position by tightening up on the clamping bolts 45 which pass through the openings 42 in the clamping ring and thread into openings 46 in the cutter head. These bolts pass through the clamping ring just behind the blades. Due to the difference in height between the foot and blade-engaging portions of this ring and the location of the bolts, when the ring is flexed by tightening the bolts, the ring first engages the blades at its periphery and the contact between the ring and the blades then spreads inwardly toward the inner side of the blade-engaging portion 37 as the bolts are further tightened. Thus the blades are pushed the more securely against the peripheral face of the seat 21, the more the ring is tightened up and any tendency of the ring to flex at its center and move the blades outwardly as the clamping bolts are tightened up is avoided. There might be such a tendency were the foot portion 38 of the same height as the clamping portion 37, or were the bolts 45 at some distance from the inner ends of the blades. Not only are the blades securely seated against the peripheral face of the seat 21, but due to the taper of the sides of the ribs of the blades and clamping ring, a wedging action is exerted on the blades at the same time, also. Thus, when the ring has been tightened, the blades are held firmly in the head against radial or circumferential displacement. It is to be noted, further, that with the construction shown, the ribs of the disc and the ribs of the blades are so interlocked that any compressional strains or thrusts on the blades are resisted by the whole cutter just as if the blades were actually integral with the ring. The ribs 40 of the ring abut the sides of the ribs 30 of the blades so that there is a substantially solid ring of metal in a plane through the ribs perpendicular to the cutter axis. Thus any tendency of either the ribs 40 or the ribs 30 to shear off under strain is resisted by all the ribs together.

When the bolts 45 are loosened, blades can readily be slipped on and off the head for then the clamping portion 37 of the ring will clear the blades.

While the invention has been described in connection with a particular embodiment, it will be understood that it is capable of further modification. The features of the invention are not limited, moreover, to the particular type of cutter shown but have application even to cutters of the face mill type such as are employed in cutting spiral bevel and hypoid gears. In general it may be said that this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A gear cutter comprising a rotary head having a blade-receiving seat and a plurality of cutting blades mounted on said seat in contiguity to one another, each of said cutting blades having a longitudinal rib of wedge shape formed on one side face thereof, and a clamping member formed with radial grooves complementary to the ribs of said blades and with radially arranged wedge-shaped ribs each of the ribs of said clamping member being shaped so as to engage adjacent sides of the ribs of a pair of adjoining blades when the blades are in position on the head, so that the ribs of the blades and the clamping member interlock, and means for actuating said clamping member into clamping position.

2. A gear cutter comprising a rotary head formed with a groove or slot therein, a plurality of cutting blades having their bottom and one side face seating against the faces of said groove and having longitudinal ribs formed on their other side faces, a clamping member for securing said blades to said head, said clamping member being formed with a recess on its inner face to provide a blade engaging portion and a foot portion spaced therefrom, said blade engaging portion being formed with ribs and grooves adapted to engage interlockingly with the ribs formed on the sides of the blades and said foot portion seating against the head, and a clamping bolt extending through said clamping member between the blade-engaging and foot portions thereof and threading into said head, the height of the foot portion being such compared to the height of the clamping portion that, when the bolt is released and the foot portion is still in contact with the head, the clamping portion will be spaced from the blades.

3. A gear cutter comprising a rotary head formed with an annular groove, a plurality of cutting blades having one side and their bottom faces seating against the faces of said groove and having longitudinal ribs formed on their other side faces, a ring member provided with an annular recess in its inner face to provide an annular blade-engaging portion and an annular foot portion spaced therefrom, the inner face of said blade-engaging portion being formed with alternate ribs and grooves to interlock with the ribs of said blades and the inner face of said foot portion resting upon the head when the ring is in clamping position, and a plurality of clamping bolts extending through said clamping ring into said head between the blade-engaging and foot portions of the ring, the height of the foot portion being such compared to the height of the clamping portion that, when the bolts are released, the foot portion will still be in contact with the head but the clamping portion will be spaced from the blades.

4. A gear cutter comprising a rotary head formed with an annular groove, a plurality of cutting blades radially arranged on the head and having one side and their bottom faces seating against the faces of said groove and having radial ribs formed on their other side faces, a ring member provided with an annular recess in its under face to form an annular blade-engaging portion and an annular foot portion spaced radially therefrom, the under face of said blade engaging portion being formed with alternate ribs and grooves to interlock with the ribs of said blade and the under face of said foot portion seating upon the head when the ring is in clamping position, and a plurality of clamping bolts extending through said clamping ring into said head between the blade engaging and foot portions of the ring, the height of the foot portion being such compared to the height of the clamping portion that when the bolts are released the foot portion will still be in contact with the head but the clamping portion will be spaced from the blades.

5. A gear cutter comprising a rotary head having a plane seat, a plurality of blades mounted in contiguity on said seat and having plane under-faces adapted to rest on said seat and being provided on their upper faces with longitudinally extending ribs, a clamping member for securing said blades on said seat, said clamping member having a foot portion adapted to engage said head and a blade-engaging portion spaced therefrom and adapted to engage said blades, said blade-engaging portion being formed with a plurality of radially-arranged ribs to interlock with the ribs of adjoining blades, and bolts operating between the foot and blade-engaging portions of the clamping member to secure the clamping member to the head in clamping position.

SCHUYLER H. EARL.